United States Patent
Shah et al.

(10) Patent No.: US 10,692,197 B2
(45) Date of Patent: *Jun. 23, 2020

(54) SYSTEMS AND TECHNIQUES FOR AUTOMATIC IMAGE HAZE REMOVAL ACROSS MULTIPLE VIDEO FRAMES

(71) Applicant: Adobe Inc., San Jose, CA (US)

(72) Inventors: Abhishek Shah, Delhi (IN); Gagan Singhal, Shakur Basti (IN)

(73) Assignee: Adobe Inc., San Jose, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 16/021,186

(22) Filed: Jun. 28, 2018

(65) Prior Publication Data

US 2018/0308225 A1    Oct. 25, 2018

Related U.S. Application Data

(63) Continuation of application No. 15/242,513, filed on Aug. 20, 2016, now Pat. No. 10,026,160.

(51) Int. Cl.
*G06K 9/00* (2006.01)
*G06T 5/00* (2006.01)
*G06K 9/46* (2006.01)

(52) U.S. Cl.
CPC .......... *G06T 5/009* (2013.01); *G06K 9/00744* (2013.01); *G06K 9/4661* (2013.01); *G06K 9/00765* (2013.01); *G06T 2207/10016* (2013.01); *G06T 2207/20092* (2013.01); *G06T 2207/20208* (2013.01)

(58) Field of Classification Search
CPC .......... G06T 5/009; G06T 2207/20092; G06T 2207/20208; G06T 2207/10016; G06K 9/00744; G06K 9/4661; G06K 9/00765

USPC ....... 382/100, 254, 274, 260, 261, 165, 166, 382/167, 190, 300, 309, 172, 173, 174, 382/218, 219, 220, 275; 348/43, 243, 348/571, 687, 607, 61, 122, 143

See application file for complete search history.

(56) References Cited

U.S. PATENT DOCUMENTS 8,290,294 B2    10/2012    Kopf et al.
8,755,628 B2 *   6/2014    Fang ................. G06T 5/009
                                                    382/274

(Continued)

OTHER PUBLICATIONS

Kaiming He, et al., "Single Image Haze Removal Using Dark Channel Prior", IEEE Explore, 2009, 8 pages.

(Continued)

*Primary Examiner* — Sheela C Chawan
(74) *Attorney, Agent, or Firm* — Kilpatrick Townsend & Stockton LLP (57) ABSTRACT

Computer-implemented systems and methods herein disclose automatic haze correction in a digital video. In one example, a video dehazing module identifies a scene including a set of video frames. The video dehazing module identifies the dark channel, brightness, and atmospheric light characteristics in the scene. For each video frame in the scene, the video dehazing module determines a unique haze correction amount parameter by taking into account the dark channel, brightness, and atmospheric light characteristics. The video dehazing module applies the unique haze correction amount parameters to each video frame and thereby generates a sequence of dehazed video frames.

20 Claims, 5 Drawing Sheets

(56) References Cited

U.S. PATENT DOCUMENTS

| | | |
|---|---|---|
| 9,292,908 B2 | 3/2016 | Stewart |
| 9,305,242 B2 * | 4/2016 | Huang .................... G06T 5/00 |
| 9,305,339 B2 | 4/2016 | Yang et al. |
| 10,026,160 B2 * | 7/2018 | Shah .................... G06T 5/009 |
| 2015/0103090 A1 | 4/2015 | Pettigrew et al. |

OTHER PUBLICATIONS

Notice of Allowance from related U.S. Appl. No. 15/242,513 dated Mar. 20, 2018, 13 pages.

* cited by examiner

SYSTEMS AND TECHNIQUES FOR AUTOMATIC IMAGE HAZE REMOVAL ACROSS MULTIPLE VIDEO FRAMES

CROSS-REFERENCE TO RELATED APPLICATIONS

This application is a continuation of U.S. patent application Ser. No. 15/242,513 that was filed on Aug. 20, 2016, allowed and now U.S. Pat. No. 10,026,160, the contents of which are incorporated herein by reference.

TECHNICAL FIELD

This disclosure relates generally to computer-implemented methods and systems for automatically determining image haze correction parameters for each video frame in a video and applying the image haze correction parameters to reduce haze effects visually obscuring the video scenes.

BACKGROUND

Scenes captured in a digital video may be contaminated with haze, such as fog, dust, smoke, or other particles that obscure the clarity of the video scenes. Users that are editing or playing the video file may need the video to be free of the haze or have reduced haze effects so that the scenes of the video are clearly depicted when played. Removing haze in a video can significantly increase the visibility of the scenes.

Conventional techniques for recovering or reducing haze in videos requires the user to manually determine haze correction parameters on a single frame of the video. Other frames of the video, however, contain different content than the single frame used to generate haze correction parameters. Applying the haze correction parameters determined from the single frame of the video to the remaining frames of the video may not produce the desired output because the content of the video changes frame by frame. The haze correction parameters, tailored for the single frame, if applied to the remainder of the frames of the video produces inconsistent haze removal results. For example, conventional techniques may yield haze removal effects that are visually jarring and disruptive as the video file plays. A digital video with haze reduced based on a single frame of reference may result in one or more video scene being free or substantially free of haze and other video scenes that still include undesired amounts of haze. A digital video with haze reduced based on a single frame of reference may also result in one video scene being darker than a subsequent video scene.

There is a need for automatically determining unique haze correction parameters optimized for each frame of a video and applying the unique haze correction parameters to the respective video frames to reduce or eliminate haze across the video.

SUMMARY

Systems and methods disclosed herein provide for automatically dehazing digital video content. In one example, a video dehazing module identifies a scene including a set of video frames. The video dehazing module identifies the dark channel, brightness, and atmospheric light characteristics in the scene. For each video frame in the scene, the video dehazing module determines a unique haze correction amount parameter by taking into account the dark channel, brightness, and atmospheric light characteristics. In some cases, the video dehazing module also determines a haze correction sensitivity parameter for each video frame. The video dehazing module applies the haze correction amount parameters (and, in some cases, the haze correction sensitivity parameters) to the video frames and thereby generates a sequence of dehazed video frames.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Computer-implemented systems and methods are disclosed for automatically determining unique haze correction parameters for each frame in a digital video and applying the unique haze correction parameters to respective frames to reduce or eliminate haze effects that may be present across the video. Haze correction parameters include a haze correction amount parameter and a haze correction sensitivity parameter. Embodiments disclosed herein utilize computer-implemented methods in video processing and video editing applications to determine unique haze correction amount parameters and haze correction sensitivity parameters for each frame in a video and apply the unique haze correction amount parameters and haze correction sensitivity parameters for the respective frames. The computer-implemented automatic haze removal techniques disclosed herein determine the haze correction parameters for each frame such that the haze correction applied from one frame to the next results in a smooth transition between frames. For example, the haze correction techniques disclosed herein result in haze correction amount and haze correction sensitivity parameters that change gradually from one frame in a scene to the next frame in the scene, reducing the likelihood of a jarring difference in haze correction from one frame to the next.

To determine unique haze correction parameters for each frame in a video, the frames of the video are first divided into a set of video scenes using scene detection techniques. Each video scene includes a set of frames. Scene detection techniques identify video scenes by identifying positions of the video in which the visual content of the video changes via, for example, different camera angles, addition or removal of different objects in the video, or a rapid movement of pixels across a series of frames in the video. The set of frames for the different video scenes are provided as inputs to a video dehazing module executing as part of or as an extension of a video editing application.

To determine the haze correction amount parameter for the frames in the set of frames (i.e. the frames in the video scene), the dehazing module first identifies certain visual characteristics for the frames in the scene. Specifically, the visual characteristics for a frame includes the average brightness value across all pixels in the frame, the average dark channel value across all pixels in the frame, and the average atmospheric light value across all pixels in the frame. For the frames in the scene, the dehazing module determines a weighted mean of the visual characteristics by applying weights to the average brightness value, the average dark channel value, and the average atmospheric light value. The weight amounts signify the relative importance to give to each of the visual characteristics. For example, providing an even distribution of weights across each of the visual characteristics (i.e. weights of 0.33 or 33% each) signifies that each of the visual characteristics is an equal factor when determining the weighted mean. The dehazing module next compares the weighted mean of the visual characteristics across the frames of the scene to determine the minimum and maximum values of the weighted mean of the visual characteristics in the scene.

For a given frame in the set of frames (i.e. for a given frame in a scene), the dehazing module determines the unique haze correction amount parameter by linearly interpolating the unique haze correction amount for the given frame based on the weighted mean of the visual characteristics of the given frame and based on the minimum and maximum values of the weighted mean across the frames in the scene.

To determine the haze correction sensitivity parameter for the frames in the set of frames, the dehazing module calculates a transmission map for the frames in the scene. The transmission map is a scaled disparity map. The dehazing module further calculates a mean of the transmission map for the frames of the scene. Next, the dehazing module compares the different mean values of the transmission maps across the frames of the scene to determine maximum and minimum mean transmission map values.

For a given frame in the set of frames, the dehazing module determines the unique haze correction sensitivity parameter by applying a logarithmic function that outputs the unique haze correction sensitivity parameter based on the maximum and minimum mean transmission map values across all of the frames in the scene and the mean transmission map value for the given frame.

The dehazing module repeats the process above for all or substantially all of the scenes in the video in order to determine the haze correction parameters for each of the frames in the video or for a representative set of frames in the video. Once the dehazing module calculates the unique haze correction amount parameter and unique haze correction sensitivity parameter for the frames in the video, the dehazing module applies the unique haze correction amount parameters and unique haze correction sensitivity parameter to the respective frames. By applying the haze correction parameters, the dehazing module modifies the pixels of the frames to reduce or eliminate the haze in the original video scene. The dehazing module then returns the dehazed frames back to the video editing application. The video dehazing process described herein extracts visual characteristics from the different scenes of the video file and transforms the data representing the pixels of the video frame by frame to yield transformed data that is optimized for each scene and specifically for each frame. The transformed data is saved to memory as a transformed video file that eliminates or substantially eliminates the haze. The original data representing pixels of a hazy digital video are thus transformed to yield a unique set of pixels for each video frame or for a representative set of video frames in the video through the process described herein and detailed as follows.

Figure 1:
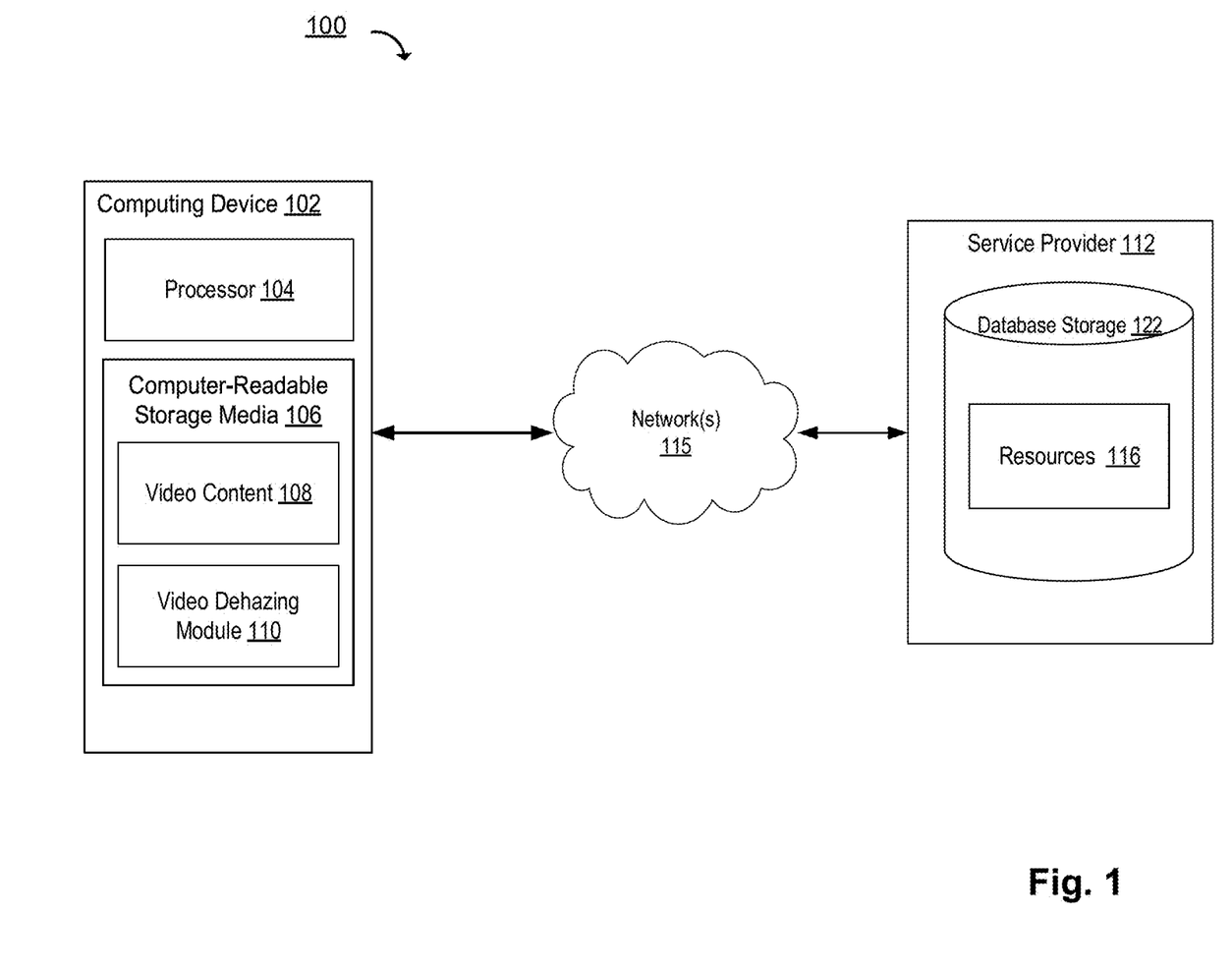
FIG. 1 is a block diagram depicting an example computing system for executing an application to automatically dehaze digital videos, according to certain embodiments herein.

Referring now to the drawings, FIG. 1 is an illustration of a computing environment 100 in an example implementation for automatically removing or reducing haze in digital videos. The computing environment 100 includes a computing device 102 having at least one processor 104 and one or more computer-readable storage media 106. The illustrated computing environment 100 also includes video content 108 and a video dehazing module 110 embodied on the computer-readable storage media 106 and operable via the processor 104 to implement corresponding functionality described herein. In at least some implementations, the computing device 102 may include functionality to access various kinds of web-based resources (content and services) and interact with online providers.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a tablet, a camera (point-and-shoot, single lens reflex (SLR), video recorder, and so on), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations in a cloud computing environment.

The computing environment 100 further depicts one or more service providers 112, configured to communicate with computing device 102 over a network 115, such as the Internet. Services provider 112 is configured to make various resources 116 available over the network 115 to connected computing devices 102. The service provider 112 may store the resources data 116 in a database storage device 122. The resources 116 include any suitable combination of services and content typically made available over a network. Examples of resources 116 include digital video files and digital photo files. In some embodiments, computing device 102 requests video data from service provider 112. In response, service provider 112 provides the requested video data to the computing device 102, which stores the video data in the computer-readable storage media 106 as video content 108. The resources 116 and the video content 108 may be formatted in any variety of digital video formats, including but not limited to MP4, M4V, MOV, WebM, FLV, SWF, VOB, OGG, AVI, WMV, and so forth.

The computing device 102 also includes a user interface (not shown) to receive user inputs and display the video content 108 on a display. Once the video dehazing module 110 processes the video content 108 to remove or reduce the haze, the dehazed video is displayed on the user interface. In some embodiments, the video dehazing module 110 is activated via the user interface. For example, the video dehazing module 110 receives an input (e.g., via a checkbox presented on the user interface) to activate automatic haze removal or reduction effects in a selected digital video file.

The video dehazing module 110 represents functionality to implement the automatic haze removal or reduction features as described herein. The video dehazing module 110 is embodied in computer-executable program code that may be a standalone software application or an add-on module in a separate video editing application. To remove or reduce the haze in a digital video (i.e. video file stored as video content 108), the video dehazing module 110 first processes the digital video to extract multiple scenes from the digital video. Each of the scenes includes a set of video frames.

Figure 2:
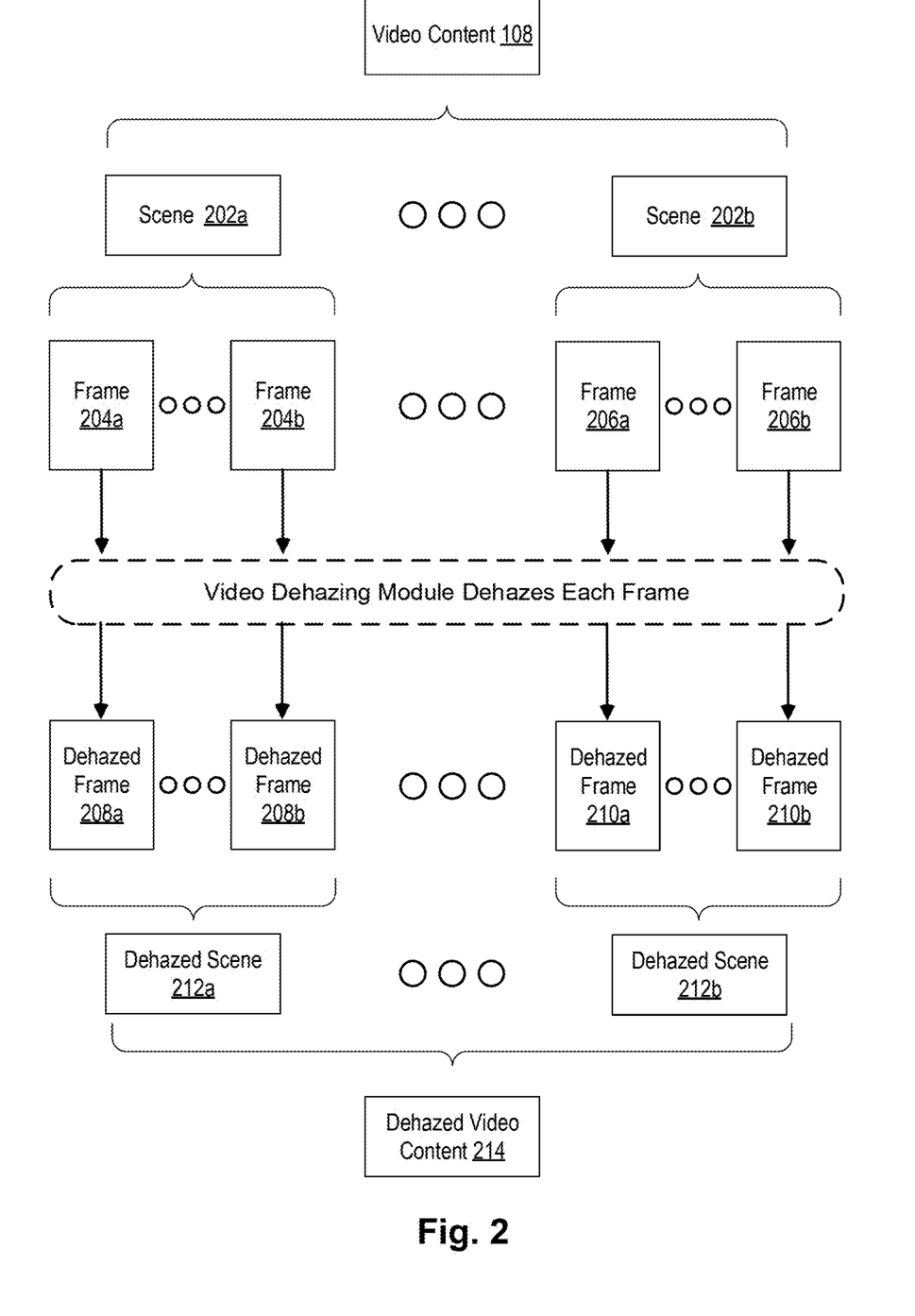
FIG. 2 is a diagram depicting example video content that is divided into multiple scenes, each scene including one or more video frames, according to certain embodiments herein.

FIG. 2 is an illustration that depicts video content 108 split into multiple video scenes 202a-b. Each scene 202a, 202b comprises a set of video frames 204a-b, 206a-b, respectively. For each of the scenes 202a-b, the video dehazing module 110 processes the respective video frames 204a-b, 206a-b to determine unique haze correction amount parameters and unique haze correction sensitivity parameters for the respective video frames 204a-b, 206a-b. By "unique" haze correction amount parameters and "unique" haze correction sensitivity parameters, it should be understood that, for a given video frame 204a, the video dehazing module 110 determines a haze correction amount parameter and a haze correction sensitivity parameter specific to the given video frame 204a according to the visual characteristics of the given video frame 204a and taking into account the average values of visual characteristics of pixels across the set of video frames 204a-b in the scene 202a. Similarly, for a given video frame 206a, the video dehazing module 110 determines a haze correction amount parameter and a haze correction sensitivity parameter specific to the video frame 206a and taking into account the average values of visual characteristics of pixels across the set of video frames 206a-b in the scene 202b. The specific visual characteristics considered by the video dehazing module 110 include the brightness characteristic of the image, the atmospheric light characteristic in the image, and the dark channel characteristic in the image, all of which are discussed in detail further below with respect to FIG. 4.

By applying the unique haze correction amount parameters and unique haze correction sensitivity parameters to the respective video frames 204a-b in scene 202a and video frames 206a-b in scene 202b, the video dehazing module 110 modifies the pixels in the video frames 204a-b, 206a-b to produce dehazed frames 208a-b, 210a-b. For example, applying the unique haze correction amount parameter and unique haze correction sensitivity parameter specific to video frame 204a produces dehazed video frame 208a. The dehazed frames 208a-b correspond to the dehazed scene 212a and the dehazed frames 210a-b correspond to the dehazed scene 212b.

The video dehazing module 110 combines the dehazed scenes 212a-b in sequence to generate the dehazed video content 214. In embodiments where the video dehazing module 110 is implemented as an add-on module to a separate video editing application, the video dehazing module 110 returns the dehazed video content 214 to the video editing application.

Figure 3:
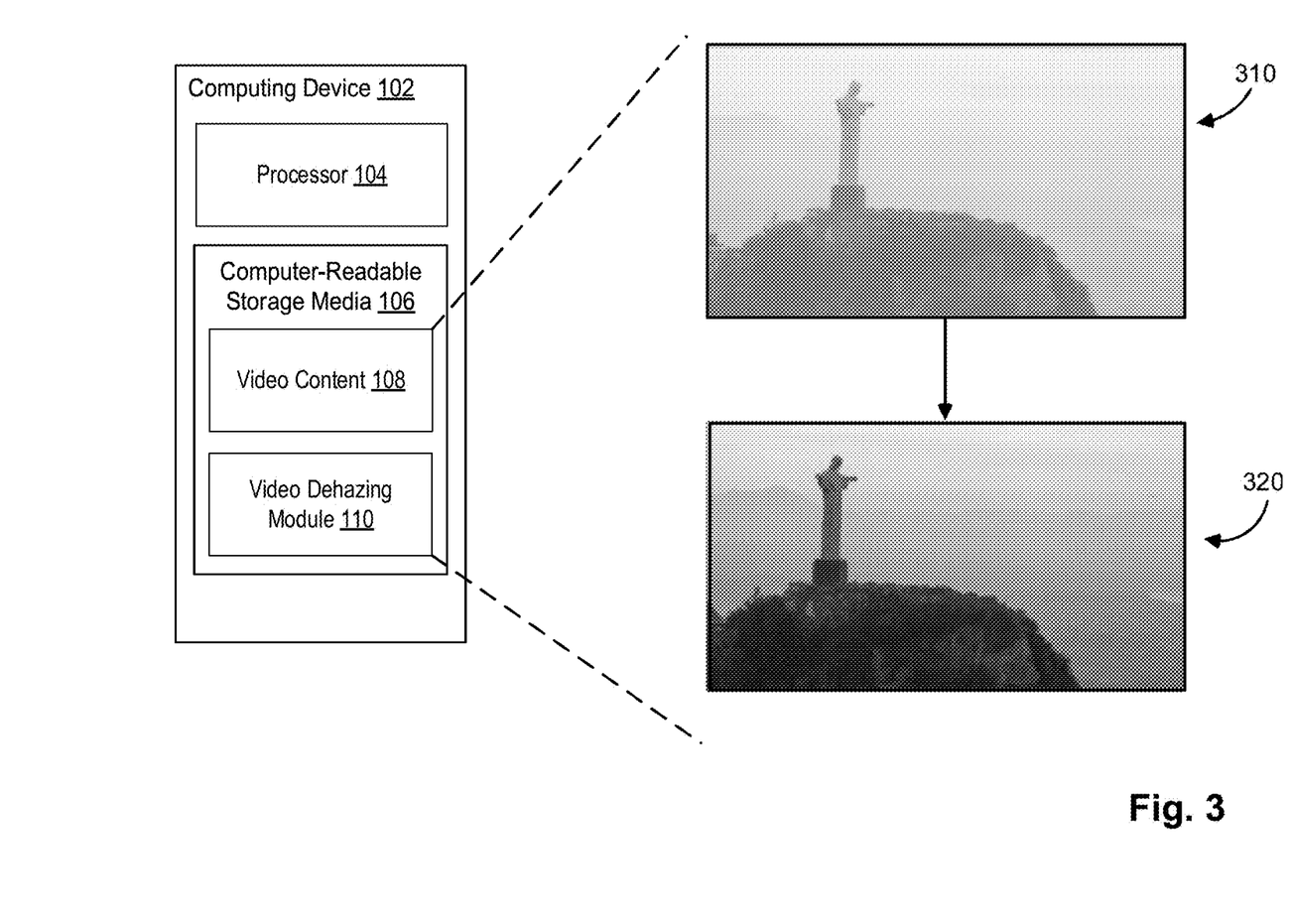
FIG. 3 is an example of a video frame in video content shown as a hazy image and as a dehazed image, according to certain embodiments herein.

To provide an example of a dehazing effect as applied to a single frame of video, FIG. 3 is an illustration that depicts an example video frame for video content 108 at the computing device 102 and a resulting dehazed video frame upon utilization of the video dehazing module 110. Video content 108 comprises a digital video that includes a video frame 310. The video content 108, which includes video frame 310, is provided to the video dehazing module 110, which implements the video dehazing features discussed herein. Upon determining the unique haze correction amount parameters and unique haze correction sensitivity parameters specific to video frame 310 (and, separately, those specific to each of the other video frames in video content 108), the video dehazing module outputs a dehazed video. The dehazed video includes dehazed video frame 320 corresponding to video frame 310. As seen in the comparison between the original video frame 310 and the dehazed video frame 320, the video dehazing module 110 reduces the haze and fog effects that obscure clarity of the original video frame 310 to produce the dehazed video frame 310. It should be understand that while a single original video frame 310 and single dehazed video frame 320 are shown for illustrative purposes, the video content 108 comprises a digital video that is made up of multiple video frames in sequence. The video dehazing module 110 determines unique haze correction amount parameters and unique haze correction sensitivity parameters specific to each of the video frames to reduce or remove haze effects in each of the video frames as seen in example dehazed video frame 320.

Figure 4:
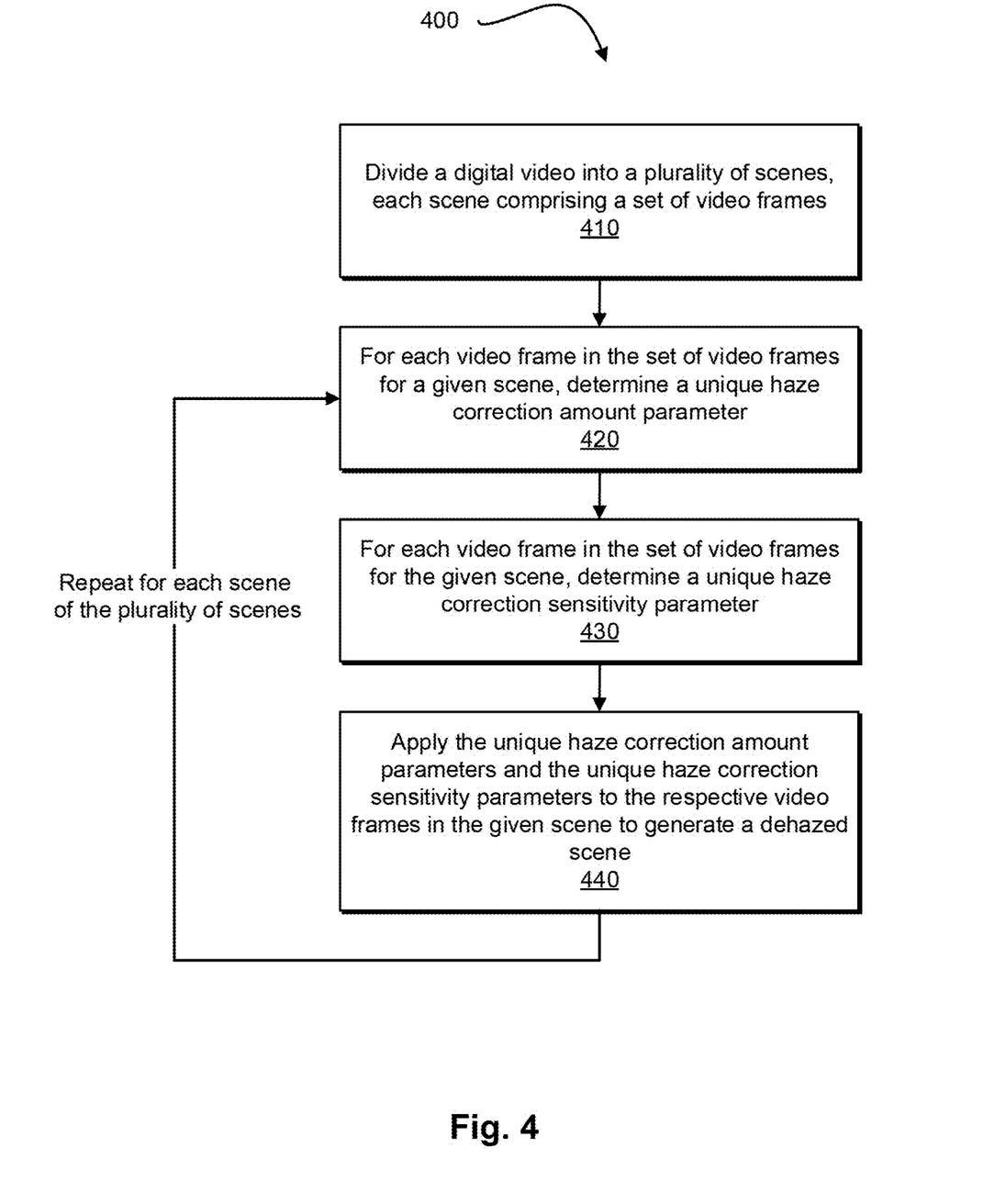
FIG. 4 is a flowchart depicting an example process for dehazing a digital video.

FIG. 4 is a flowchart depicting an example process 400 for performing automatic haze correction in a video file according to embodiments herein. The process 400 is implemented by the haze correction module 110 executing as program code in computing device 102.

In step 410, the video dehazing module 110 receives the video content 108 comprising a digital video and divides the digital video into multiple video scenes. Each of the video scenes comprises a set of video frames. The video dehazing module 110 divides the digital video in separate scenes by applying known scene detection techniques. In one example scene detection technique, the video dehazing module 110 analyzes each video frame of the digital video to identify objects that appear in a repeated sequence of video frames (i.e. by identifying groups of pixels that appear in a repeated sequence of video frames). Groups of pixels that appear in a repeated sequence of video frames may indicate that the sequence of video frames corresponds to a scene. For example, a video that depicts a first scene at a beach and a second scene at a city will have a first group of pixels that appear at the beach (e.g., pixels corresponding to the sand, pixels corresponding to the sea, etc.) during repeated video frames capturing the beach and a second group of pixels that appear at the city setting (e.g., pixels corresponding to a building, pixels corresponding to a car, etc.) during repeated video frames capturing the city setting. In another example scene detection technique, the video dehazing module 110 identifies sudden changes in lighting characteristics or contrast characteristics between video frames. A change in lighting or contrast characteristics may indicate a change scene. The video dehazing module 110 may utilize a combination of scene detection techniques. Other scene detection techniques are possible and may be used in addition to or instead of the techniques described above. Each of the scenes identified by the video dehazing module 110 includes a set of video frames (e.g., a first set of video frames 204a-b for a first scene 202a and a second set of video frames 206a-b for a second scene 202b).

Next, for each identified scene, the video dehazing module 110 identifies unique haze correction amount parameters and unique haze correction sensitivity parameters specific to each of the frames in the scene. Specifically, in step 420, in a given scene, the video dehazing module 110 determines a unique haze correction amount parameter for each video frame in the scene. For example, for scene 202a, the video dehazing module 110 determines a first unique haze correction amount parameter for video frame 204a and a second unique haze correction amount parameter for video frame 204b.

The haze correction amount parameter for a video frame 204a is determined by applying a haze correction calculation that takes into account certain visual characteristics of the video frame 204a as well as average visual characteristics across the entire scene 202a. The term visual characteristics as used herein refers to the brightness characteristic, the dark channel characteristic, and the atmospheric light characteristic present in the frame. Each video frame can be analyzed to determine the average brightness characteristics of the pixels in the video frame, the average dark channel characteristic of the video frame, and the average atmospheric light characteristic of the video frame.

The brightness characteristic is an attribute of visual perception in which a source appears to be radiating or reflecting light. In other words, brightness is the perception elicited by the luminance of a visual target. The brightness for a pixel of video frame 204a is determined by the intensity value of the pixel. The average value of the brightness characteristics of the video frame 204a is calculated as the mean intensity value in the video frame 204a. The video dehazing module 110 determines the average value of the brightness characteristics for all the pixels in the video frame 204a. The average brightness characteristic in a given video frame 204a is referred to herein as $b_t$.

Dark channel information is based on the observation that in non-sky regions of haze-free outdoor images at least one color channel (e.g., from the Red-Green-Blue (RGB) channels) has a low intensity at some pixels. In other words, haze-free outdoor images generally have a dark channel that is significantly darker than images with haze. This can be attributed to haze-free images usually being more saturated (some color channel has a relatively large value and another color channel has a relatively small value) than hazy images. Dark channel information is sometimes referred to as the minimum color channel in a local block of pixels. The dark channel information extracted from a hazy video frame 204a indicates a minimum color channel in a given region (i.e. the minimum RGB values for a given region of pixels in the video frame). Various techniques exist to calculate the dark channel information in an image. In one example, given an input image I, a region size parameter r, the global atmospheric light in the scene A, and position in the video frame x, the dark channel of a video frame $D_r^I(x)$ may be computed according to the following:

$$D_r^I(x) = \min_{y \in \Omega_r(x)} \min_{c \in (r,g,b)} \frac{I^c(y)}{A} \in [0, 1]$$

In this equation, $\Omega_r(x)$ represents a region in the video frame centered at position x with size r×r. The video dehazing module 110 calculates the average dark channel characteristic across different regions of pixels of the video frame 204a. The average dark channel characteristic in the video frame 204a is referred to herein as $d_t$.

The video dehazing module 110 also determines the average atmospheric light characteristic in the video frame 204a. Atmospheric light is sometimes referred to as airlight. The atmospheric light characteristic represents the constant light in the video frame 204a. Various techniques exist to calculate the atmospheric light of a video frame 204a. In one example, to determine the atmospheric light characteristic for a video frame 204a, the video dehazing module 110 considers the dark channel information. From the dark channel information, the video dehazing module 110 finds a subset of pixels (e.g., one percent of pixels) that have the largest dark channel values of the hazy video frame 204a. The video dehazing module 110 then determines the atmospheric light characteristic by determining a median dark channel value of the of the subset of pixels. In another example, the video dehazing module 110 determines a subset of pixels (e.g., 0.1% of pixels) whose dark channel value are the largest and then identifies the brightest pixel in the subset. The average atmospheric light characteristic in the video frame 204a is referred to herein as $a_t$.

It should be understood that the descriptions above for calculating the average brightness characteristic, average dark channel characteristic, and the average atmospheric light characteristic for a given frame are provided for illustrative purposes and other methods for calculating these visual characteristics of the video frame are also possible.

The video dehazing module 110 determines the average brightness characteristics $b_t$, average dark channel characteristics $d_t$, and average atmospheric light characteristics $a_t$ for each video frame 204a-b in the scene 202a. Using these values, the video dehazing module 110 determines an average weighted value of the visual characteristics with the following equation:

$$ahc_t = \frac{(w1 * b_t + w2 * d_t + w3 * a_t)}{(w1 + w2 + w3)},$$

where w1, w2, and w3 are weights applied to $b_t$, $d_t$, and $a_t$ respectively.

By default, the video dehazing module 110 applies equal weights to the $b_t$, $d_t$, and $a_t$ values. The weights signify the importance of the respective visual characteristics to take into account when determining the average value of the visual characteristics. For example, applying equal weights to the visual characteristics entails setting w1, w2, and w3 all to ⅓. In some embodiments, the computing device 102 receives weight inputs from a user via a user interface, allowing the user to adjust the weights per the user's preferences. The weights w1, w2, and w3 may be set to any value that total to 1.0. For example, setting the weights as w1=0.5, w2 as 0.25, and w3 to 0.25 would configure the video dehazing module 110 to give stronger weight to the brightness characteristic relative to the atmospheric light characteristic and the dark channel characteristic.

The video dehazing module 110 repeats the calculation above for $ahc_t$ for all video frames 204a-b in the scene 202a. Upon applying the calculation to each video frame 204a-b, the video dehazing module 110 has stored in computer memory a unique average weighted value of visual characteristics ($ahc_t$ value) for each video frame 204a, 204b in a scene 202a.

Next, the video dehazing module 110 determines the minimum $ahc_t$ value and the maximum $ahc_t$ value among the video frames 204a-b in scene 202a by comparing the specific $ahc_t$ values for each video frame 204a-b. The minimum and maximum $ahc_t$ values in the scene 202a are referred to herein as $ahc_{min}$ and $ahc_{max}$, respectively. The video dehazing module 110 then calculates the unique haze correction amount for a video frame 204a as a function of $ahc_{min}$ and $ahc_{max}$ as well as the specific $ahc_t$ value for the video frame 204a. Specifically, the video dehazing module 110 unique haze correction amount $Y_t$ using the following formula:

$$Y_t = \left(\frac{mh_{max} - mh_{min}}{ahc_{max} - ahc_{min}}\right) * (ahc_t - ahc_{min}) + mh_{min}$$

where $mh_{max}$ and $mh_{min}$ refer to the minimum and maximum values for the haze correction amount, respectively. The $mh_{min}$ and $mh_{max}$ the may take the values of, for example, 0 and 1 respectively, 0 indicating the minimum amount to apply as the haze correction amount parameter and 1 indicating the maximum amount to apply as the haze correction amount parameter. Other values are also possible.

The equation to calculate the unique haze correction amount parameter $Y_t$ for the frame 204a is an equation to linearly interpolate the proper haze correction amount parameter based on the $ahc_{min}$ and $ahc_{max}$ in the scene 202a. For example, for the video frame in the scene 202a that has $ahc_{min}$ as the average weighted value of the visual characteristics (i.e. the video frame in scene 202a with an $ahc_t$ value that corresponds to $ahc_{min}$), the equation above returns the haze correction amount parameter ($Y_t$) as $mh_{min}$. Similarly, for the video frame in the scene 202b that has $ahc_{max}$ as the average weighted value of the visual characteristics (i.e. the video frame in scene 202a with an $ahc_t$ value that corresponds to $ahc_{max}$), the equation above returns the haze correction amount parameter ($Y_t$) as $mh_{max}$. For video frames with $ahc_t$ values between $ahc_{min}$ and $ahc_{max}$, the video dehazing module 110 linearly interpolates the unique haze correction amount parameter ($Y_t$) and determines the corresponding Yt that falls between $mh_{min}$ and $mh_{max}$ according to the linear interpolation.

The video dehazing module 110 thus applies the equation above for Yt for each video frame 204a-b in the scene 202a to determine the unique haze correction amount parameters for the respective video frames 204a-b.

In step 430, for a given scene, the video dehazing module 110 determines a unique haze correction sensitivity parameter for each video frame in the scene. For example, for scene 202a, the video dehazing module 110 determines a first unique haze sensitivity parameter for video frame 204a and a second unique haze correction sensitivity parameter for video frame 204b. Generally, a larger haze correction sensitivity parameter corresponds to a greater intensity of haze reduction in a given frame.

The haze correction sensitivity parameter for a video frame 204a is determined by determining the transmission map for each video frame 204a-b in the scene 202a and applying a logarithmic function to derive the unique haze correction sensitivity parameter for each video frame 204a-b based on the minimum and maximum transmission map values in the scene 202a and based on the specific transmission map values for the respective video frames 204a-b.

For example, for each video frame 204a-b, the video dehazing module 110 calculates the transmission map for the video frame. The transmission map is a matrix that is the size of the video frame size and based on the average dark channel, average brightness, and scattering of atmospheric light in given video frame. One skilled in the art would understand how to calculate a transmission map. For example, see U.S. Pat. No. 9,305,339 to Yang, et al. ("Multi-feature image haze removal") and K. He, et al, "Single image haze removal using dark channel prior," in Computer Vision and Pattern Recognition, IEEE Conference on, 2009, pp. 1956-1963. The video dehazing module 110 thus calculates a unique transmission map for each video frame 204a-b.

Next, the video dehazing module 110 compares the transmission map values across the video frames 204a-b in the scene 202a to determine the maximum transmission map value (referred to as $MT_{max}$) and the minimum transmission map value (referred to as $MT_{min}$).

Based on the transmission map values and the maximum and minimum transmission map values in the scene 202a, the video dehazing module 110 determines the unique haze correction sensitivity parameter ($S_t$) for each video frame by applying the following function:

$$S_t = S_{min} + \left(\left(\frac{\ln(MT - MT_{min} + 1)}{\ln(MT_{max} - MT_{min} + 1)}\right) * (S_{max} - S_{min})\right)$$

where $S_{min}$ refers to the minimum possible haze correction sensitivity parameter and $S_{max}$ refers to the maximum possible haze correction sensitivity parameter, and wherein MT corresponds to the transmission map value for the specific video frame for which $S_t$ is being calculated. For example, $S_{max}$ may take the value of 1 (indicating a maximum haze correction sensitivity parameter) and $S_{max}$ may take the value of 0 (indicating a minimum haze correction sensitivity parameter). Other values are also possible. As the function is logarithmic, the possible range of haze correction sensitivity parameters is narrow.

In step 440, the video dehazing module 110 applies the unique haze correction amount parameters and the unique haze correction sensitivity parameters to the respective video frames 204a-b in the scene 202a to generate a dehazed scene. For example, the video dehazing module 110 adjusts the individual pixels of each video frame 204a-b according to the specific haze correction amount parameters and haze correction sensitivity parameters for the respective video frames 204a-b. One skilled in the art would understand how the haze correction amount parameters and haze correction sensitivity parameters are applied to dehaze each video frame 204a-b. For example, see U.S. Pat. No. 9,305,339 to Yang, et al. ("Multi-feature image haze removal") and K. He, et al, "Single image haze removal using dark channel prior," in Computer Vision and Pattern Recognition, IEEE Conference on, 2009, pp. 1956-1963.

The video dehazing module 110 performs steps 420 to 440 for each scene in the digital video to derive a sequence of dehazed scenes. The sequence of dehazed scenes correspond to a dehazed video, which has reduced fog and haze effects that would have otherwise obscured the video. The video haze correction techniques described herein result in a smooth and seamless transition in the haze correction between video frames. This produces an output video that appears natural to the viewer and that does not contain large changes in haze correction from one frame to the next. The unique steps described herein contribute towards the smooth transition from one video frame to the next by implementing gradual changes in haze correction between frames. For example, determining haze correction amount parameters and haze correction sensitivity parameters by taking into account maximum and minimum values of certain visual characteristics by scene and determining haze correction amount parameters by linearly interpolating the appropriate values helps achieve this gradual change in haze correction from one frame to the next. Determining haze correction sensitivity parameters by applying a logarithmic function further factors into obtaining a gradual change in haze correction from one frame to the next. This results in haze correction that is relative and appropriate based on the content in each scene.

While FIG. 4 indicates that visual characteristics are determined for each video frame in the video and that the haze correction parameters are determined for each of the video frames, one skilled in the art would understand that in some embodiments, visual characteristics and haze correction parameters may be determined for a sample of frames in the video and that the dehazing of the video can be applied to the sample of frames.

Figure 5:
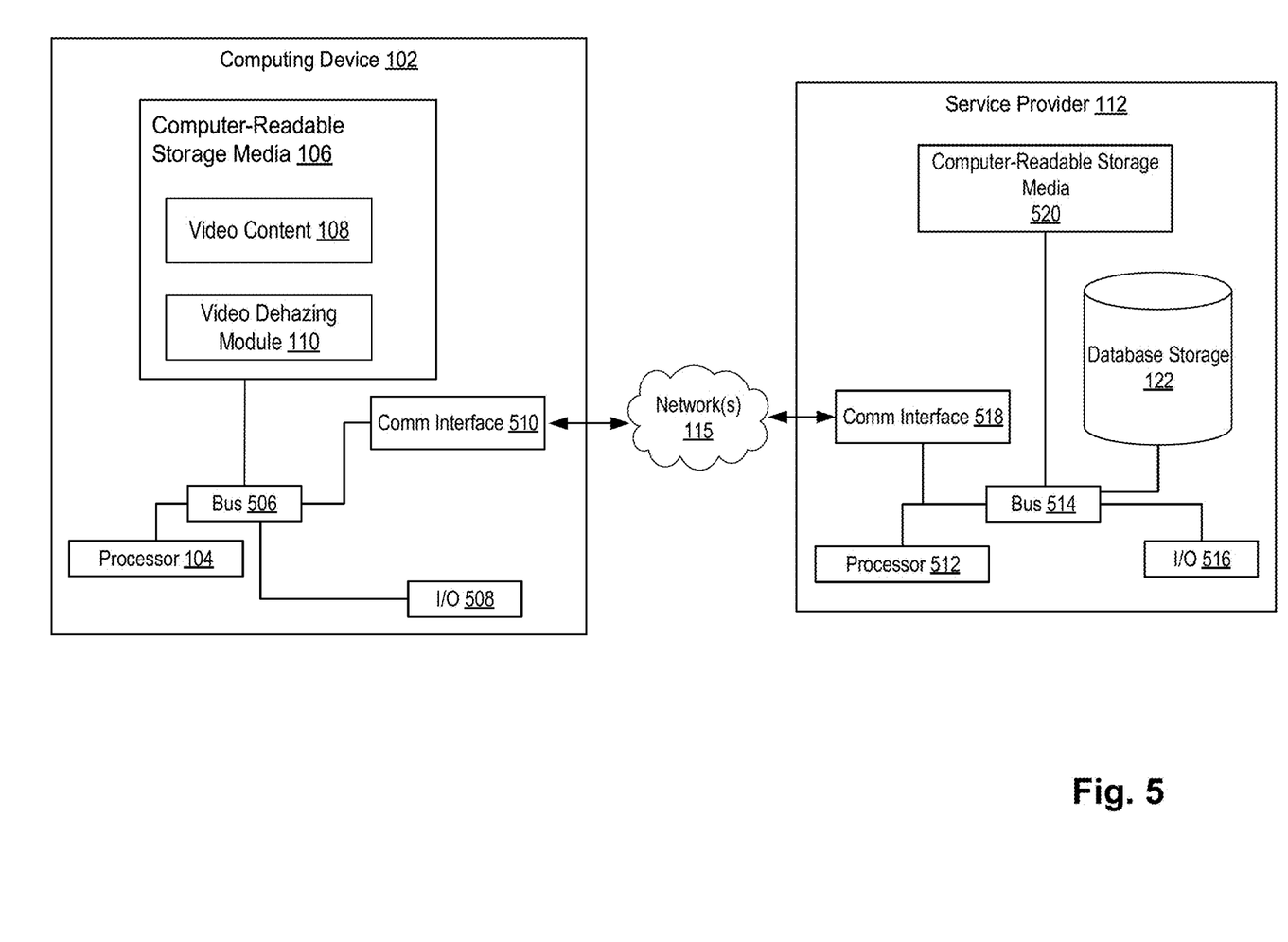
FIG. 5 is a block diagram depicting example hardware implementations for the components described in FIG. 1.

Any suitable computing system or group of computing systems can be used to implement the computing device 102 and service provider 112. For example, FIG. 5 is a block diagram depicting examples of implementations of such components. The computing device 102 includes a processor 104 that is communicatively coupled to the computer-readable storage media 106 and that executes computer-executable program code and/or accesses information stored in the computer-readable storage media 106. The processor 104 comprises, for example, a microprocessor, an application-specific integrated circuit ("ASIC"), a state machine, or other processing device. The processor 104 includes one processing device or more than one processing device.

The computer-readable storage media 106 includes any suitable non-transitory computer-readable medium. The computer-readable medium includes any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C #, Visual Basic, Java, Python, Perl, JavaScript, and ActionScript.

The computing device 102 also comprises a number of external or internal devices such as input or output devices. For example, the computing device 102 is shown with an input/output ("I/O") interface 508 that receives input from input devices or provide output to output devices. A bus 506 is also included in the computing system 102. The bus 506 communicatively couples one or more components of the computing system 102.

The computing device 102 executes program code that configures the processor 104 to perform one or more of the operations described above. The program code includes the video content 108 (i.e. the digital video). The program code also includes the video dehazing module 110. The program code is resident in the computer-readable storage media 106 or any suitable computer-readable medium and is executed by the processor 104 or any other suitable processor. In additional or alternative embodiments, one or more modules are resident in a memory that is accessible via a data network, such as a memory accessible to a cloud service.

The computing device 102 also includes a communication interface 510. The communication interface 510 includes any device or group of devices suitable for establishing a wired or wireless data connection to one or more data networks 115. Non-limiting examples of the communication interface 510 include an Ethernet network adapter, a modem, and/or the like. The computing device 102 transmits messages as electronic or optical signals via the communication interface 510. For example, the computing device 102 may receive the video content 108 from the service provider 112 over network 115.

Similar to the computing device 102, the service provider 112 also includes a processor 512, I/O interface 516, communication interface 518, and computer-readable storage media 520 communicatively coupled via a bus 514. The computer-readable storage media 520 includes non-transitory computer-readable memory as described above and stores program code defining operations of the service provider 112.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method executed at a video editing application for reducing haze effects present in a digital video, wherein the method includes one or more processing devices performing operations comprising:
    computing, for video frames presenting a scene, a set of haze correction amount parameters from dark channel, brightness, and atmospheric light characteristics in the scene;
    computing, for the video frames, a set of haze correction sensitivity parameters from transmission map values in the scene; and
    applying the set of haze correction amount parameters and the set of haze correction sensitivity parameters to the video frames in the scene by manipulating pixels of the video frames and thereby causing the video editing application to generate a set of dehazed video frames.

2. The method of claim 1, wherein computing a particular haze correction amount parameter for a particular video frame from the video frames comprises:
    computing a mean brightness value across pixels in the particular video frame, a mean atmospheric light value in the particular video frame, and a mean dark channel value in the particular video frame;
    computing a weighted average value of frame visual characteristics in the particular video frame from the mean brightness value, the mean atmospheric light value, and the mean dark channel value;
    computing, from the weighted average values of frame visual characteristics, a range of weighted average values of scene visual characteristics in the scene; and
    interpolating the particular haze correction amount parameter based on (i) the weighted average value of frame visual characteristics and (ii) the range of weighted average values of scene visual characteristics in the scene.

3. The method of claim 2, the operations further comprising:
    adjusting, based on an input received via a user interface of the video editing application, respective weights for the mean brightness value, the mean dark channel value, and the mean atmospheric light value in the weighted average value of frame visual characteristics,
    wherein a sum of the respective weights remains constant before the adjustment and after the adjustment.

4. The method of claim 1, wherein computing the set of haze correction sensitivity parameters comprises:
    computing transmission maps for the video frames, respectively;
    identifying, from the transmission maps, a maximum transmission map and a minimum transmission map;
    identifying a maximum haze correction sensitivity parameter and a minimum haze correction sensitivity parameter; and
    computing, for each video frame, a respective haze correction sensitivity parameter based on a function of the maximum transmission map, the minimum transmission map, the maximum haze correction sensitivity parameter, and the minimum haze correction sensitivity parameter.

5. The method of claim 4, wherein the function comprises a logarithmic function.

6. The method of claim 1, wherein the digital video comprises the video frames presenting the scene and additional video frames presenting an additional scene, wherein the operations further comprises:
    dividing the digital video into the scene and the additional scene by applying a scene-detection technique;
    computing, for the additional video frames, an additional set of haze correction amount parameters and an additional set of haze correction sensitivity parameters, wherein one or more of a haze correction amount parameter and a haze correction sensitivity parameter is different between the video frames and the additional video frames; and
    applying the additional set of haze correction amount parameters and the set additional of haze correction sensitivity parameters to the additional video frames and thereby causing the video editing application to generate an additional set of dehazed video frames.

7. The method of claim 6, wherein the scene-detection technique comprises identifying, from frames of the digital video, one or more of:
    a change in camera angle;
    an addition or removal of an object in the digital video; and
    a movement of pixels across a series of frames in the digital video.

8. A system comprising:
    a non-transitory computer-readable medium storing program code of a video editing application; and
    a processing device communicatively coupled to the non-transitory computer-readable medium, wherein the processing device is configured for executing the program code and thereby performing operations comprising:
        dividing a digital video into a set of scenes by applying a scene-detection technique,
        computing, for video frames presenting a scene from the set of scenes, a set of haze correction amount parameters from dark channel, brightness, and atmospheric light characteristics in the scene, and
        applying the set of haze correction amount parameters to the video frames in the scene by manipulating pixels of the video frames and thereby causing the video editing application to generate a set of dehazed video frames.

9. The system of claim 8, wherein computing a particular haze correction amount parameter for a particular video frame from the video frames comprises:
    computing a mean brightness value across pixels in the particular video frame, a mean atmospheric light value in the particular video frame, and a mean dark channel value in the particular video frame;
    computing a weighted average value of frame visual characteristics in the particular video frame from the mean brightness value, the mean atmospheric light value, and the mean dark channel value;
    computing, from the weighted average values of frame visual characteristics, a range of weighted average values of scene visual characteristics in the scene; and
    interpolating the particular haze correction amount parameter based on (i) the weighted average value of frame visual characteristics and (ii) the range of weighted average values of scene visual characteristics in the scene.

10. The system of claim 9, the operations further comprising:
    adjusting, based on an input received via a user interface of the video editing application, respective weights for the mean brightness value, the mean dark channel value, and the mean atmospheric light value in the weighted average value of frame visual characteristics, wherein a sum of the respective weights remains constant before the adjustment and after the adjustment.

11. The system of claim 8, the operations further comprising:
computing, for the video frames, a set of haze correction sensitivity parameters from transmission map values in the scene; and
applying the set of haze correction amount parameters to the video frames in the scene by further manipulating the pixels of the video frames and thereby causing the video editing application to generate the set of dehazed video frames.

12. The system of claim 11, wherein computing the set of haze correction sensitivity parameters comprises:
computing transmission maps for the video frames, respectively;
identifying, from the transmission maps, a maximum transmission map and a minimum transmission map;
identifying a maximum haze correction sensitivity parameter and a minimum haze correction sensitivity parameter; and
computing, for each video frame, a respective haze correction sensitivity parameter based on a function of the maximum transmission map, the minimum transmission map, the maximum haze correction sensitivity parameter, and the minimum haze correction sensitivity parameter.

13. The system of claim 12, wherein the function comprises a logarithmic function.

14. The system of claim 8, wherein the scene-detection technique comprises identifying, from frames of the digital video, one or more of:
a change in camera angle;
an addition or removal of an object in the digital video; and
a movement of pixels across a series of frames in the digital video.

15. A non-transitory computer-readable medium having program code of a video editing application stored thereon, wherein the program code, when executed by one or more processing devices, causes the one or more processing devices to perform operations comprising:
computing, for video frames presenting a scene, a set of haze correction amount parameters from dark channel, brightness, and atmospheric light characteristics in the scene;
computing, for the video frames, a set of haze correction sensitivity parameters from transmission map values in the scene; and
applying the set of haze correction amount parameters and the set of haze correction sensitivity parameters to the video frames in the scene by manipulating pixels of the video frames and thereby causing the video editing application to generate a set of dehazed video frames.

16. The non-transitory computer-readable medium of claim 15, wherein computing a particular haze correction amount parameter for a particular video frame from the video frames comprises:
computing a mean brightness value across pixels in the particular video frame, a mean atmospheric light value in the particular video frame, and a mean dark channel value in the particular video frame;
computing a weighted average value of frame visual characteristics in the particular video frame from the mean brightness value, the mean atmospheric light value, and the mean dark channel value;
computing, from the weighted average values of frame visual characteristics, a range of weighted average values of scene visual characteristics in the scene; and
interpolating the particular haze correction amount parameter based on (i) the weighted average value of frame visual characteristics and (ii) the range of weighted average values of scene visual characteristics in the scene.

17. The non-transitory computer-readable medium of claim 16, the operations further comprising:
adjusting, based on an input received via a user interface of the video editing application, respective weights for the mean brightness value, the mean dark channel value, and the mean atmospheric light value in the weighted average value of frame visual characteristics, wherein a sum of the respective weights remains constant before the adjustment and after the adjustment.

18. The non-transitory computer-readable medium of claim 15, wherein computing the set of haze correction sensitivity parameters comprises:
computing transmission maps for the video frames, respectively;
identifying, from the transmission maps, a maximum transmission map and a minimum transmission map;
identifying a maximum haze correction sensitivity parameter and a minimum haze correction sensitivity parameter; and
computing, for each video frame, a respective haze correction sensitivity parameter based on a function of the maximum transmission map, the minimum transmission map, the maximum haze correction sensitivity parameter, and the minimum haze correction sensitivity parameter.

19. The non-transitory computer-readable medium of claim 18, wherein the function comprises a logarithmic function.

20. The non-transitory computer-readable medium of claim 15, wherein a digital video comprises the video frames presenting the scene and additional video frames presenting an additional scene, wherein the operations further comprises:
dividing the digital video into the scene and the additional scene by applying a scene-detection technique, wherein the scene-detection technique comprises identifying, from frames of the digital video, one or more of:
a change in camera angle,
an addition or removal of an object in the digital video, and
a movement of pixels across a series of frames in the digital video;
computing, for the additional video frames, an additional set of haze correction amount parameters and an additional set of haze correction sensitivity parameters, wherein one or more of a haze correction amount parameter and a haze correction sensitivity parameter is different between the video frames and the additional video frames; and
applying the additional set of haze correction amount parameters and the set additional of haze correction sensitivity parameters to the additional video frames and thereby causing the video editing application to generate an additional set of dehazed video frames.

* * * * *